United States Patent
Pan (10) Patent No.: US 11,285,872 B2
(45) Date of Patent: Mar. 29, 2022

(54) REARVIEW MIRROR HAVING DISPLAY INSTRUMENT FUNCTION AND CONTROL SYSTEM THEREOF

(71) Applicants: Global Media Industry Group Co., Ltd., Shenzhen (CN); Lei Pan, Shenzhen (CN)

(72) Inventor: Lei Pan, Shenzhen (CN)

(73) Assignee: Global Media Industry Group Co., Ltd., Shenzhen (CN)

( * ) Notice: Subject to any disclaimer, the term of this patent is extended or adjusted under 35 U.S.C. 154(b) by 529 days.

(21) Appl. No.: 16/340,205

(22) PCT Filed: Mar. 20, 2018

(86) PCT No.: PCT/CN2018/079656
§ 371 (c)(1),
(2) Date: Apr. 8, 2019

(87) PCT Pub. No.: WO2019/153439
PCT Pub. Date: Aug. 15, 2019

(65) Prior Publication Data
US 2021/0339677 A1   Nov. 4, 2021

(30) Foreign Application Priority Data

Feb. 6, 2018  (CN) .......................... 201810122117.5

(51) Int. Cl.
*B60R 1/00* (2006.01)
*B60R 1/06* (2006.01)
(Continued)

(52) U.S. Cl.
CPC .............. *B60R 1/00* (2013.01); *B60Q 1/2696* (2013.01); *B60Q 1/54* (2013.01); *B60Q 5/005* (2013.01);
(Continued)

(58) Field of Classification Search
CPC .......... B60R 1/00; B60R 1/06; B60R 1/1207; B60R 2001/1215; B60R 2001/1223;
(Continued)

(56) References Cited

U.S. PATENT DOCUMENTS

2010/0201896 A1* 8/2010 Ostreko .................... B60R 1/12
349/1
2013/0170013 A1 7/2013 Tonar et al.

FOREIGN PATENT DOCUMENTS

CN          2792873        7/2006
CN        101894833       11/2010
(Continued)

OTHER PUBLICATIONS

International Search Report and Written Opinion dated Sep. 11, 2018 from Chinese Application No. PCT/CN2018/079656.

*Primary Examiner* — Clifford Hilaire
*Assistant Examiner* — Tyler B Edwards
(74) *Attorney, Agent, or Firm* — Hogan Lovells US LLP (57) ABSTRACT

A rearview mirror having a display instrument function and a control system thereof are provided. The rearview mirror includes LED lights, glass and a glue-filled fluorophor located between the LED lights and the glass. Light rays emitted from the LED lights pass through the glue-filled fluorophor and are directed towards the glass. The glue-filled fluorophor includes a body and an extension portion, the body is flush with the LED lights, the extension portion is above the body and higher than the LED lights. Light-emitting areas are formed on outer surfaces of the body and the extension portion. The control system of the rearview mirror includes an OBD, an MCU and LED lights. The OBD is configured to acquire information on rpm and vehicle speed, and transmits it to the MCU. The MCU receives the
(Continued)

information, generates control information and transmits it to a corresponding LED light for display.

15 Claims, 11 Drawing Sheets

(51) Int. Cl.
  *B60R 1/12* (2006.01)
  *B60Q 1/26* (2006.01)
  *B60Q 1/54* (2006.01)
  *B60Q 5/00* (2006.01)

(52) U.S. Cl.
  CPC .............. *B60R 1/06* (2013.01); *B60R 1/1207* (2013.01); *B60R 2001/1215* (2013.01); *B60R 2001/1223* (2013.01); *B60R 2001/1253* (2013.01); *B60R 2001/1284* (2013.01)

(58) Field of Classification Search
  CPC .... B60R 2001/1253; B60R 2001/1284; B60R 2001/1276; B60Q 1/2696; B60Q 1/54; B60Q 5/005
  See application file for complete search history.

(56) References Cited

FOREIGN PATENT DOCUMENTS

| CN | 101954884 | | 1/2011 |
|---|---|---|---|
| CN | 101954884 A | * | 1/2011 |
| CN | 102300746 | | 12/2011 |
| CN | 202806560 | | 3/2013 |

* cited by examiner

REARVIEW MIRROR HAVING DISPLAY INSTRUMENT FUNCTION AND CONTROL SYSTEM THEREOF

The present disclosure claims the priority to the Chinese patent application No. CN201810122117.5, filed with the China State Intellectual Property Administration on Feb. 6, 2018 and entitled "Rearview Mirror Having Display instrument Function and Control System Thereof", which is incorporated herein by reference in its entirety.

TECHNICAL FIELD

The present disclosure relates to the technical field of automobile parts, and particularly to a rearview mirror having a display instrument function and a control system thereof.

BACKGROUND ART

For the existing automobiles, in order to enable a driver to know the conditions such as the vehicle speed, rpm (revolution per minute, engine speed) and oil mass, it is often necessary to display various parameters on an instrument panel.

The existing instrument panel is located directly in front of the driver, at a slightly lower position. When the driver intends to view the instrument panel, he needs to avert his gaze, and sometimes, the instrument panel is obscured by the steering wheel and cannot be viewed clearly, which is not conducive to driving safety and awareness of the conditions of the vehicle.

For conventional automobile interior rearview mirrors, a small LED screen, VFD screen or the like is adopted to be embedded in the interior rearview mirror. However, the display areas of such kinds of screens are relatively small. Moreover, the displayed content cannot reach the edge of the rearview mirror, and the display effect is not gorgeous. Thus, this method is rarely used at present.

Some other conventional rearview mirrors have a TFT liquid crystal screen embedded therein. However, for such a screen, since the price thereof is high and there is a certain width of non-working area at the edge of the liquid crystal screen, the displayed content cannot reach the utmost edge of the rearview mirror, which is visually unaesthetic.

For some other rearview mirrors, LED characters are densely distributed at the margin of the LED screen of a front shell to indicate the information such as vehicle speed and rpm. However, in general, the LED characters are relatively distant from the edge of the front shell, and the display area is too small.

SUMMARY

An object of the present disclosure is to provide a rearview mirror having a display instrument function and a control system thereof, in order to alleviate the technical problem existing in the prior art that the display area of a rearview mirror with the display instrument function is relatively small.

In order to alleviate the above technical problem, the technical solution provided by the present disclosure lies in:

a rearview mirror having a display instrument function, comprising

LED lights, a glue-filled fluorophor and glass;

wherein the glue-filled fluorophor is located between the LED lights and the glass, and light rays emitted from the LED lights pass through the glue-filled fluorophor and are directed towards the glass; and the glue-filled fluorophor comprises a body and an extension portion, the body is flush with the LED lights, the extension portion is located above the body and higher than the LED lights and a light-emitting area is formed on each of an outer surface of the body and an outer surface of the extension portion.

Further, an edge of the glass protrudes from a front shell, an interior of the glass is provided with an arc-shaped inner surface, and a reflected light channel is formed on one side of the glass facing the front of the vehicle; and light rays directed from the extension portion to the arc-shaped inner surface are reflected on the arc-shaped inner surface, and the reflected light rays emerge through the reflected light channel, thereby forming a light-emitting narrow edge in the front of the vehicle.

Further, the rearview mirror comprises a plurality of glue-filled fluorophors, wherein the plurality of glue-filled fluorophors are distributed at the edge of the glass and a plurality of glue-filled fluorophors at least form an LED display area for rpm and an LED display area for vehicle speed; and further, the LED display area for rpm and the LED display area for vehicle speed are each provided with digital LED lights and dashed-line LED lights;

wherein the digital LED lights are configured to display an integer value, and the dashed-line LED lights are configured to display a non-integer value.

Further, the rearview mirror further comprises a front shell, the front shell and the glass are bonded to one another by a double-sided tape, and the front shell and the double-sided tape are each provided thereon with openings for keeping away from the plurality of glue-filled fluorophor, a touch key, a nixie tube and a screen; and further, the rearview mirror further comprises a PET transparent film, wherein the PET transparent film is disposed on one side of the front shell facing away from the glass and the PET transparent film is provided thereon with openings for keeping away from the plurality of glue-filled fluorophor, the touch key, the nixie tube and the screen.

Further, the rearview mirror further comprises a PCB board for LED light, wherein the PCB board for LED light is provided thereon with LED lights, a touch key board and a nixie tube, and the PCB board for LED light is further provided with an opening for keeping away from the screen.

Further, the rearview mirror further comprises a screen, wherein the screen is attached to one side of the PCB board for LED light facing away from the glass and covers the opening of the PCB board for LED light for keeping away from the screen.

Further, the rearview mirror further comprises a rear shell assembly, wherein the rear shell assembly comprises a rear shell body, a loudspeaker mounted on one side of the rear shell body facing the glass, a grip ball socket which is mounted on the side of the rear shell body facing the glass and passes through the rear shell body, and a bracket which is disposed on one side of the rear shell body facing away from the glass and is connected with the grip ball socket.

Further, the rear shell assembly further comprises a rubber column, wherein the rubber column is inserted in a corresponding stand column of the rear shell body for use of connection and support.

Further, the glass is provided thereon with a light transmissive area of photoresistor, wherein light transmissive area of photoresistor is configured to adjust brightness of the screen and reflectivity of the glass according to brightness of collected light rays.

A control system of a rearview mirror having a display instrument function, comprising an OBD (On-Board Diagnostic), an MCU (Microcontroller Unit) and LED lights;

wherein the OBD is configured to acquire information on rpm and vehicle speed, and transmit the information on rpm and vehicle speed to the MCU;

the MCU is in signal connection with the OBD, and is configured to receive the information on rpm and vehicle speed, then generate control information according to the information on rpm and vehicle speed, and transmit the control information to a corresponding LED light; and each of the LED lights is in signal connection with the MCU, and is configured to light up upon receipt of the control information.

Further, the control system further comprises a TP (Touch Panel) key, a nixie tube, an expansion port and a sound module;

wherein the TP key is used for inputting functional information to the MCU;

the nixie tube is in signal connection with the MCU, and is configured to display the control information of the MCU after receiving the control information of the MCU;

the expansion port is in signal connection with the MCU for displaying information on oil consumption or temperature parameters; and the sound module is in signal connection with the MCU, and is configured to output audio information.

Further, the LED lights light up sequentially as the speed increases, and the LED lights go out sequentially as the speed decreases, producing a dynamic effect.

Further, the sound module is turned up as the speed increases, and the sound module is turned down as the speed decreases.

According to the technical solutions described above, the technical effects that the present disclosure can achieve are as follows:

The present disclosure provides a rearview mirror having a display instrument function, wherein the rearview mirror comprises LED lights, a glue-filled fluorophor and glass; the glue-filled fluorophor is located between the LED lights and the glass; and the glue-filled fluorophor comprises a body and an extension portion, wherein the body is flush with the LED lights, the extension portion is located above the body and higher than the LED lights, and a light-emitting area is formed on each of an outer surface of the body and an outer surface of the extension portion. The rearview mirror having a display instrument function provided by the present disclosure has a relatively large display area, and the LED light-emitting area of the rearview mirror having a display instrument function provided by the present disclosure is closer to the edge, thereby allowing the rearview mirror to retain as much mirror area as possible.

BRIEF DESCRIPTION OF DRAWINGS

In order to more clearly illustrate the technical solutions of the embodiments of the present disclosure or in the prior art, brief description is made below on the drawings required to be used in the description of the embodiments or the prior art. It is apparent that the drawings described below illustrate some of the embodiments of the present disclosure, and for a person of ordinary skills in the art, other drawings may be obtained from these drawings without inventive effort.

REFERENCE SIGNS

1—glass; 2—double-sided tape; 3—front shell; 4—PET transparent film; 5—glue-filled fluorophor; 51—body; 52—extension portion; 6—PCB board for LED light; 7—screen; 8—screen PCB; 9—rubber column; 10—loudspeaker; 11—grip ball socket; 12—rear shell body; 13—bracket; 14—light-emitting narrow edge; 001—OBD; 002—MCU; 003—TP key; 004—LED light; 005—nixie tube; 006—expansion port; 007—sound module; A—LED display area for rpm; B—LED display area for vehicle speed; C—nixie tube display area for rpm; D—screen display area; E—light transmissive area of photoresistor; F—display area for extended function; G—nixie tube display area for vehicle speed; and H—display area for TP key.

DETAILED DESCRIPTION OF EMBODIMENTS

The technical solutions of the present disclosure will be clearly and completely described below with reference to the drawings. It is apparent that the embodiments described are some of the embodiments of the present disclosure, rather than all of the embodiments of the present disclosure. All the other embodiments that are obtained by a person of ordinary skills in the art on the basis of the embodiments of the present disclosure without inventive effort shall be covered by the protection scope of the present disclosure.

In the description of the present disclosure, it is to be noted that the orientation or position relation denoted by terms such as "center", "upper", "lower", "left", "right", "vertical", "horizontal", "inner" and "outer" is based on the orientation or position relation indicated by the figures, which only serves to facilitate describing the present disclosure and simplify the description, rather than indicating or suggesting that the device or element referred to must have a particular orientation, or is constructed and operated in a particular orientation, and therefore should not be construed as a limitation on the present disclosure. In addition, the terms such as "first", "second" and "third" merely serve the purpose of description and cannot be understood as an indication or implication of relative importance.

In the description of the present disclosure, it should be noted that unless otherwise explicitly specified or defined, the terms "mount", "link" and "connect" shall be understood in a broad sense, which may, for example, refer to a fixed connection, a detachable connection or an integral connection; may refer to a mechanical connection or an electrical connection; may refer to a direct connection or an indirect connection by means of an intermediate medium; and may refer to communication between two elements. A person of ordinary skills in the art could understand the specific meaning of the terms in the present disclosure according to specific situations.

Below, embodiment 1 and embodiment 2 will be described in detail with reference to the accompanying drawings.

Figure 1:
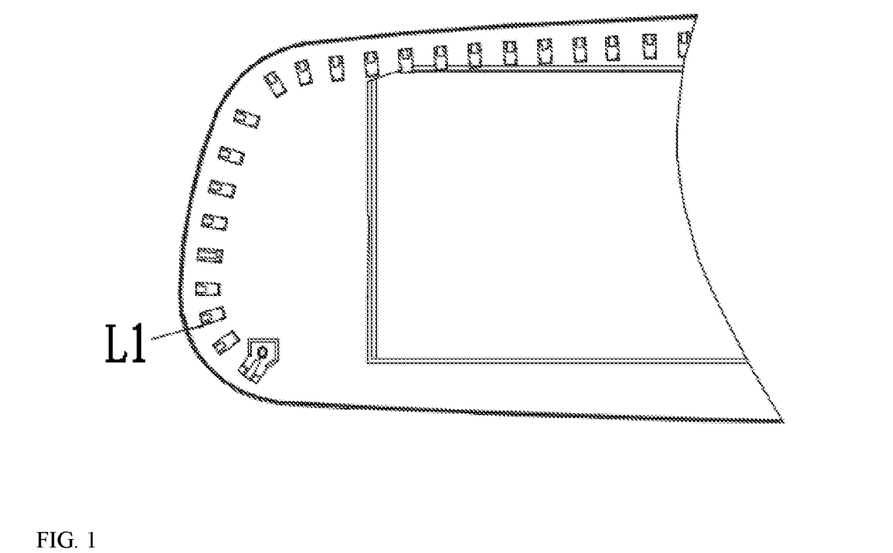
FIG. 1 is a partial schematic view of a rearview mirror having a display instrument function in the prior art (L1 is a distance between an LED light and the edge)
Figure 2:
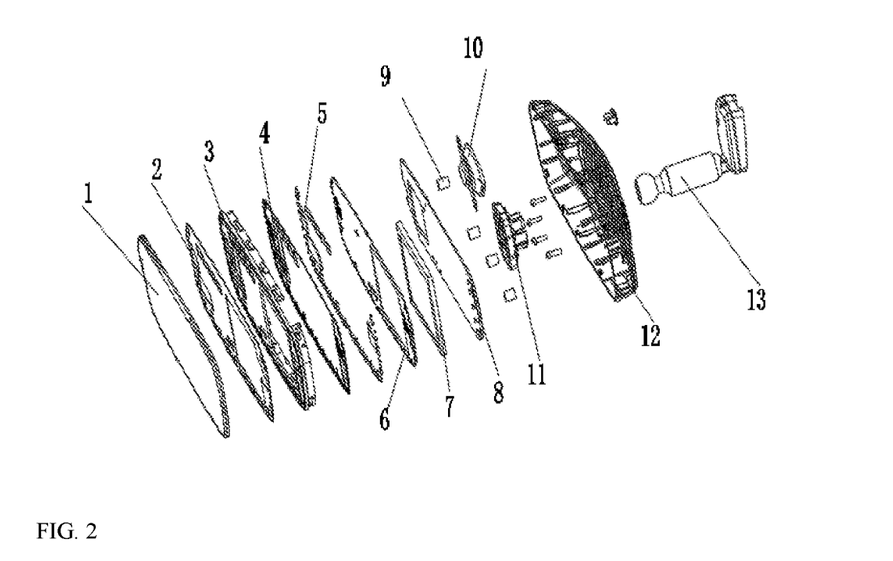
FIG. 2 is an exploded schematic view of a rearview mirror having a display instrument function according to an embodiment of the present disclosure.
Figure 3:
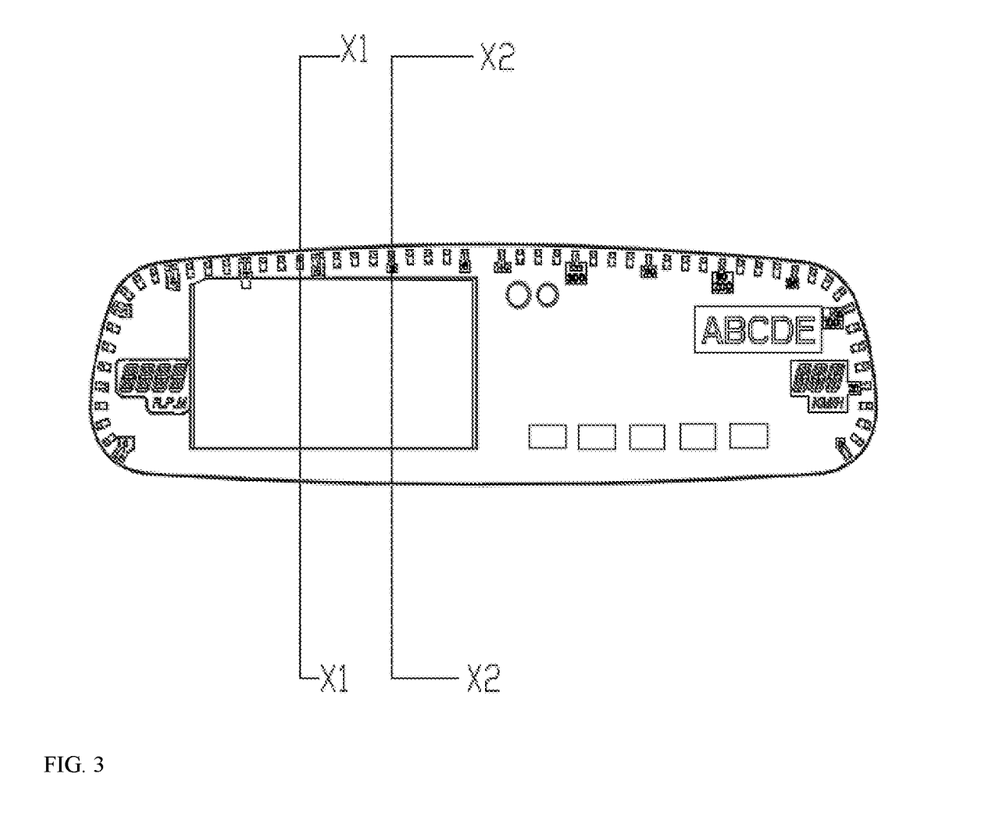
FIG. 3 is a front view of a rearview mirror having a display instrument function according to an embodiment of the present disclosure (X1-X1 corresponds to LED lights for non-integer values; and X2-X2 corresponds to a section of LED lights for integer values)
Figure 4:
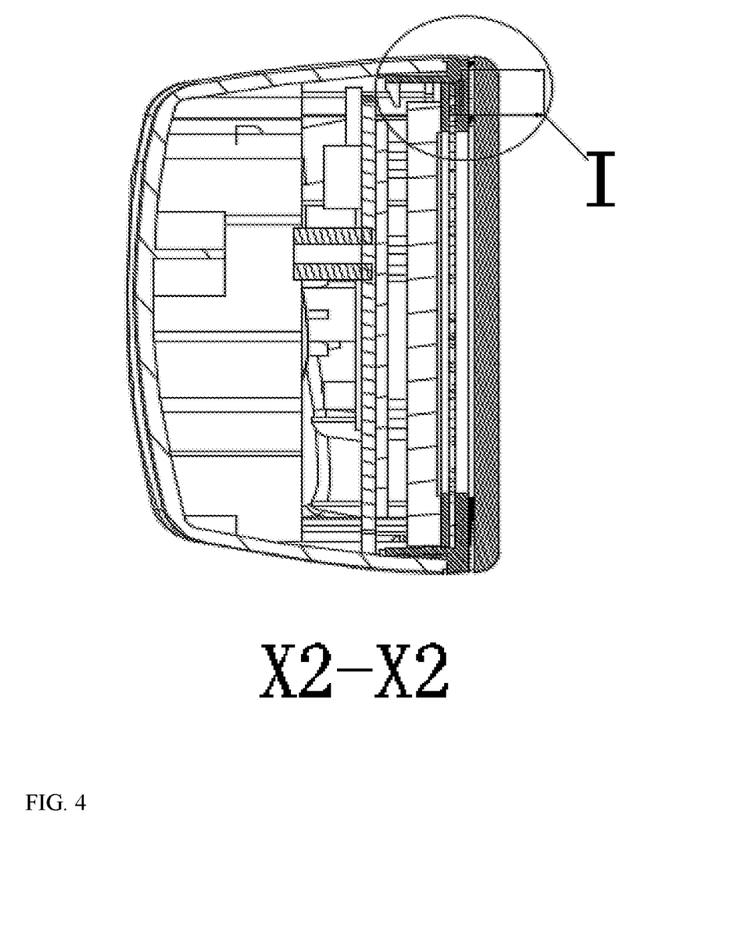
FIG. 4 is a sectional schematic view taken along X2-X2 of a rearview mirror having a display instrument function according to an embodiment of the present disclosure.
Figure 5:
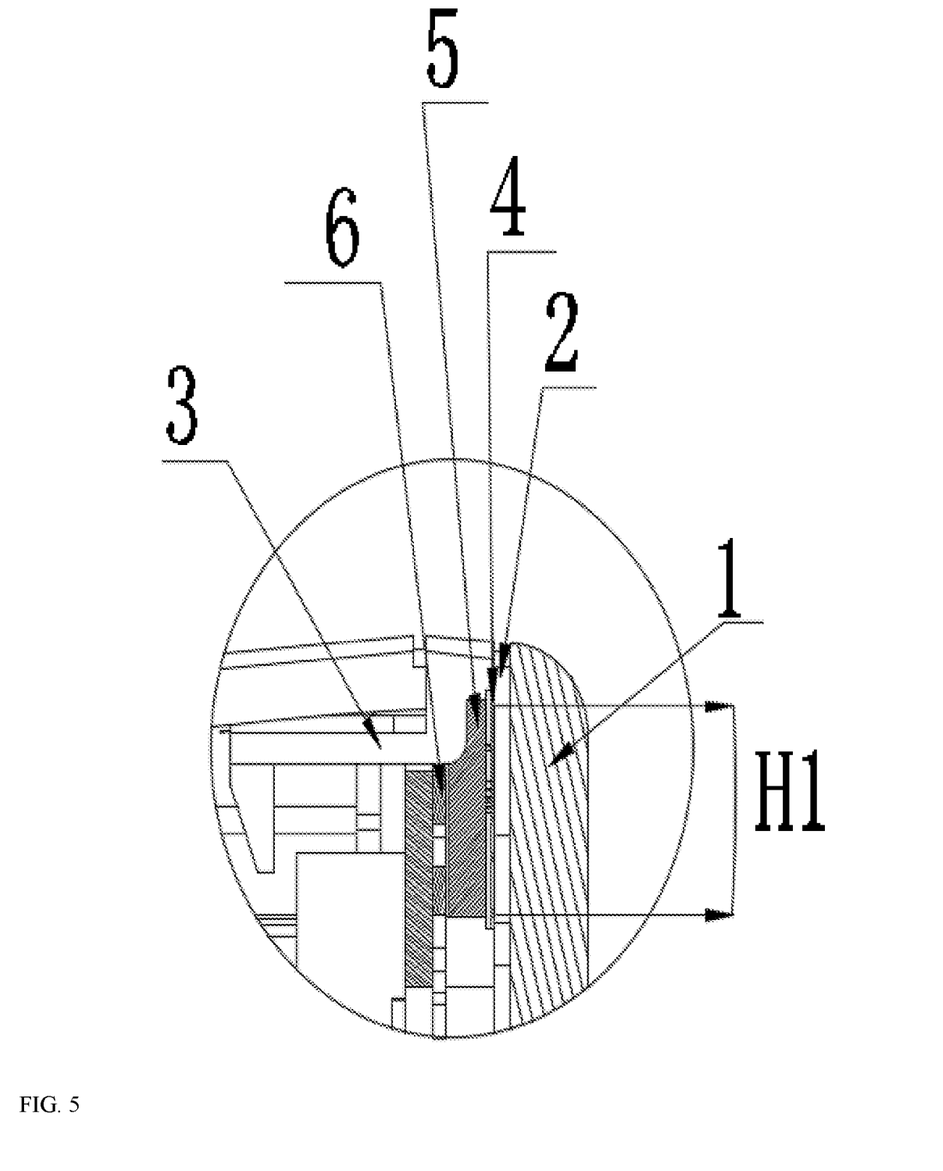
FIG. 5 is a partially enlarged view of I in FIG. 4.
Figure 6:
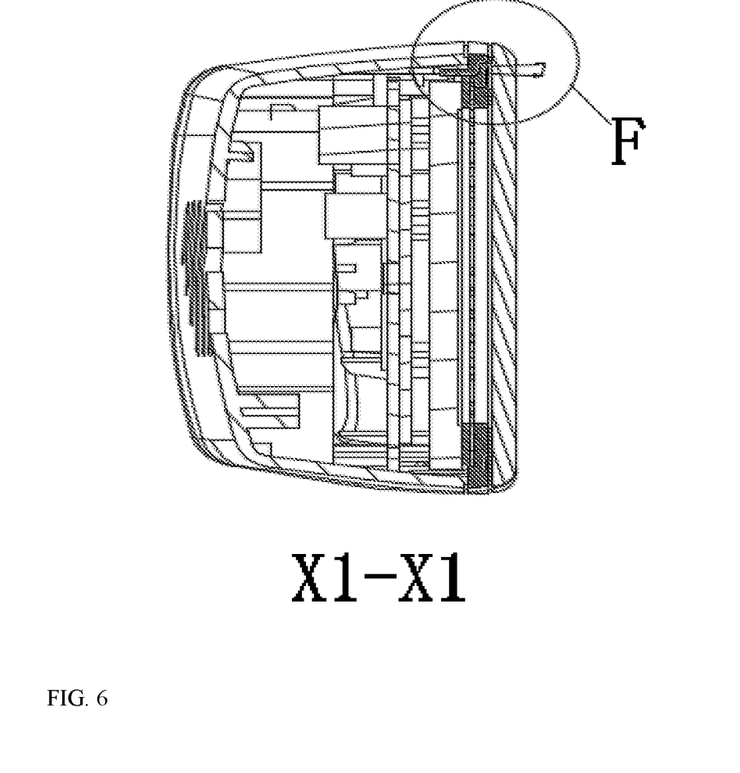
FIG. 6 is a sectional schematic view taken along X1-X1 of a rearview mirror having a display instrument function according to an embodiment of the present disclosure.
Figure 7:
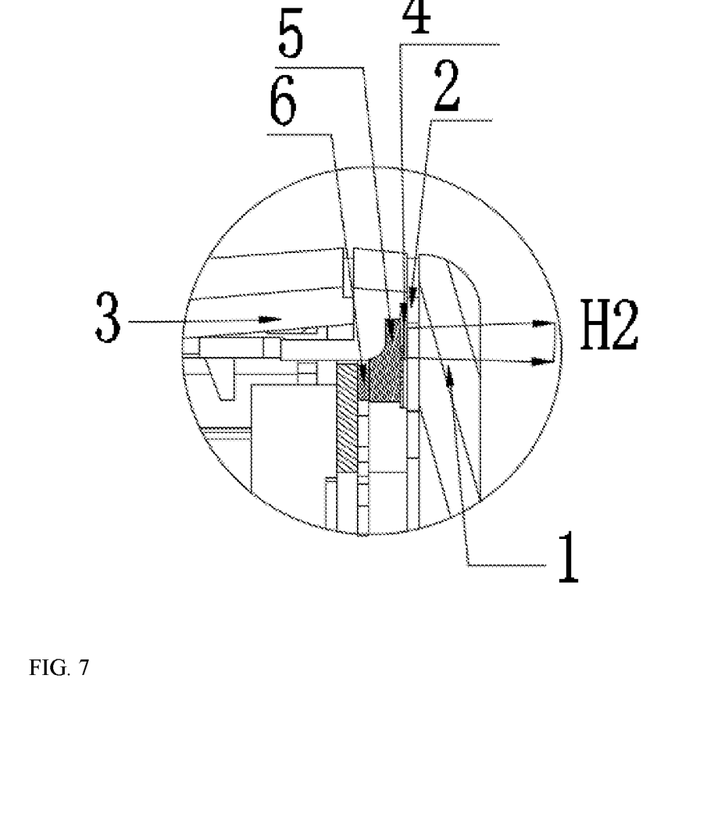
FIG. 7 is a partially enlarged view of F in FIG. 6.
Figure 8:
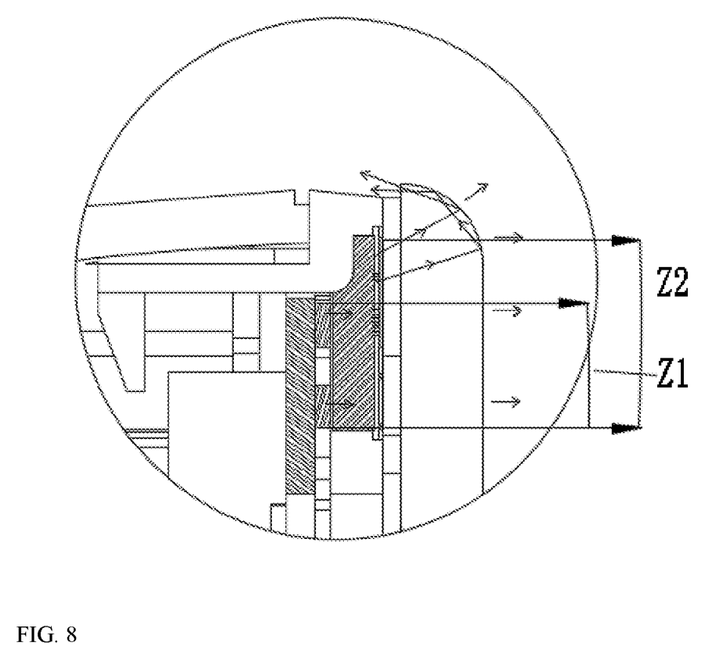
FIG. 8 is a schematic diagram of optical paths of a rearview mirror having a display instrument function according to an embodiment of the present disclosure (Z1 corresponds to an light-emitting area of the body of the glue-filled fluorophor, and Z2 corresponds to an light-emitting area corresponding to the whole glue-filled fluorophor)
Figure 9:
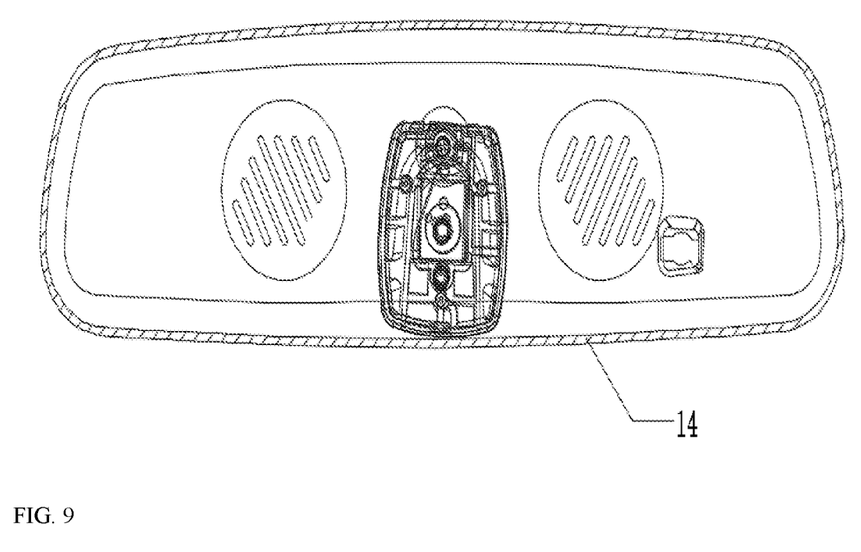
FIG. 9 is a schematic diagram of a light-emitting narrow edge of a rearview mirror having a display instrument function according to an embodiment of the present disclosure.
Figure 10:
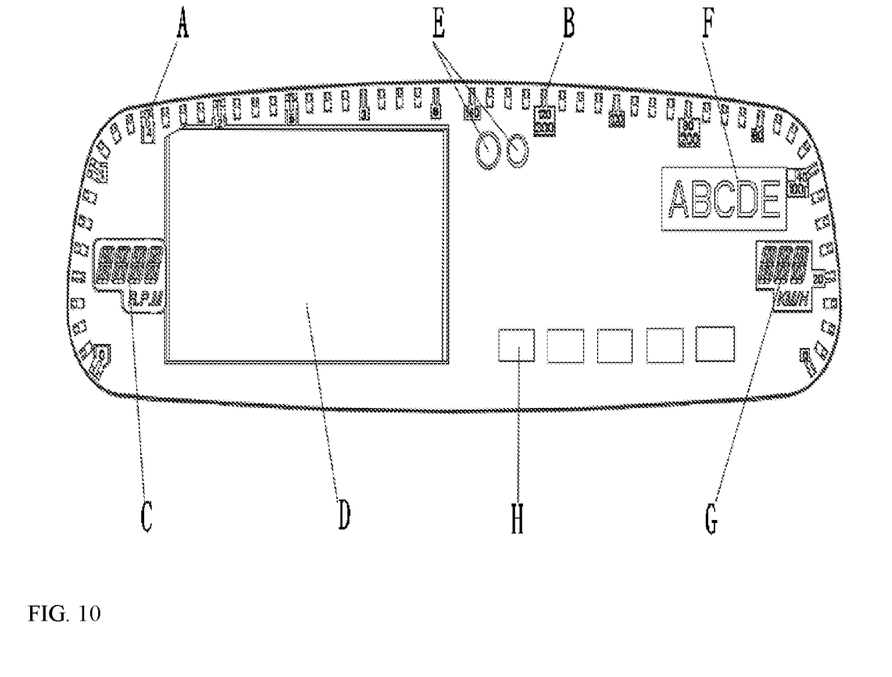
FIG. 10 is a schematic diagram of various functional areas of a rearview mirror having a display instrument function according to an embodiment of the present disclosure.
Figure 11:
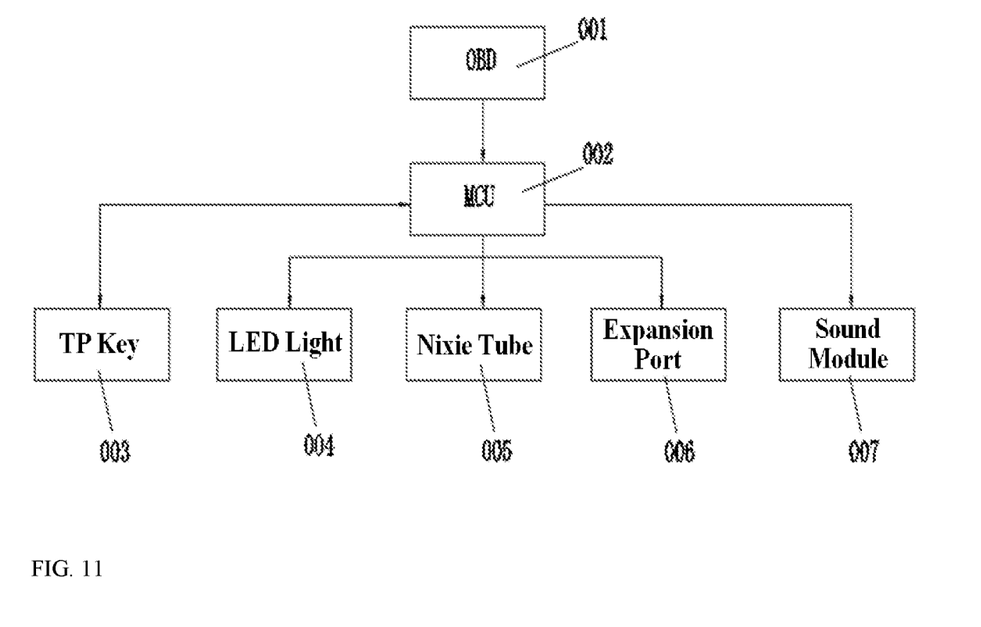
FIG. 11 is a schematic diagram illustrating control principle of a rearview mirror having a display instrument function according to an embodiment of the present disclosure.
Figure 12:
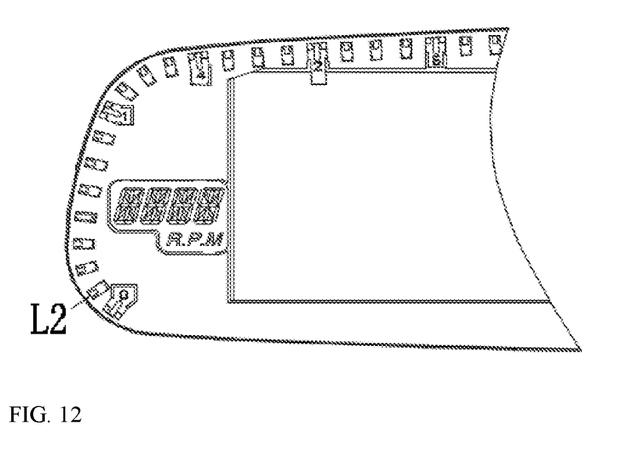
FIG. 12 is a partial schematic view of a rearview mirror having a display instrument function according to an embodiment of the present disclosure (L2 is a distance between an LED light and the edge)
Figure 13:
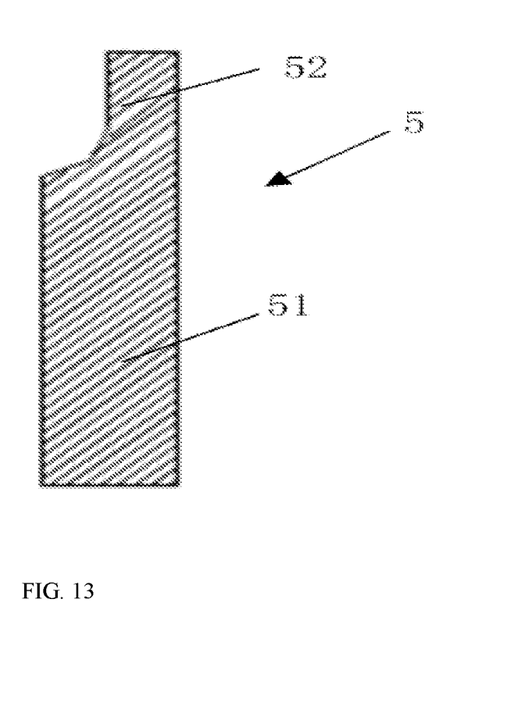
FIG. 13 is a structural schematic diagram of a glue-filled fluorophor in a rearview mirror having a display instrument function according to an embodiment of the present disclosure.

FIG. 1 is a partial schematic view of a rearview mirror having a display instrument function in the prior art (L1 is a distance between an LED light and the edge); FIG. 2 is an exploded schematic view of a rearview mirror having a display instrument function according to an embodiment of the present disclosure; FIG. 3 is a front view of a rearview mirror having a display instrument function according to an embodiment of the present disclosure (X1-X1 corresponds to LED lights for non-integer values; and X2-X2 corresponds to a section of LED lights for integer values); FIG. 4 is a sectional schematic view taken along X2-X2 of a rearview mirror having a display instrument function according to an embodiment of the present disclosure; FIG. 5 is a partially enlarged view of I in FIG. 4; FIG. 6 is a sectional schematic view taken along X1-X1 of a rearview mirror having a display instrument function according to an embodiment of the present disclosure; FIG. 7 is a partially enlarged view of F in FIG. 6; FIG. 8 is a schematic diagram of optical paths of a rearview mirror having a display instrument function according to an embodiment of the present disclosure (Z1 corresponds to the light-emitting area of the body of the glue-filled fluorophor, and Z2 corresponds to the light-emitting area corresponding to the whole glue-filled fluorophor); FIG. 9 is a schematic diagram of a light-emitting narrow edge of a rearview mirror having a display instrument function according to an embodiment of the present disclosure; FIG. 10 is a schematic diagram of various functional areas of a rearview mirror having a display instrument function according to an embodiment of the present disclosure; FIG. 11 is a schematic diagram illustrating control principle of a rearview mirror having a display instrument function according to an embodiment of the present disclosure; FIG. 12 is a partial schematic view of a rearview mirror having a display instrument function according to an embodiment of the present disclosure (L2 is a distance between an LED light and the edge); and FIG. 13 is a structural schematic diagram of a glue-filled fluorophor in a rearview mirror having a display instrument function according to an embodiment of the present disclosure.

Embodiment 1

The present embodiment provides a rearview mirror having a display instrument function, comprising LED lights, a glue-filled fluorophor 5 and glass 1;

wherein the glue-filled fluorophor 5 is located between the LED light and the glass 1, and light rays emitted from the LED light pass through the glue-filled fluorophor 5 and are directed towards the glass 1; and the glue-filled fluorophor 5 comprises a body 51 and an extension portion 52, the body 51 is flush with the LED lights, the extension portion 52 is located above the body 51 and higher than the LED lights, and a light-emitting area is formed on each of an outer surface of the body 51 and an outer surface of the extension portion 52.

According to the technical solution described above, the technical effects that the present disclosure can achieve are as follows:

The present disclosure provides a rearview mirror having a display instrument function, wherein the rearview mirror comprises LED lights, a glue-filled fluorophor 5 and glass 1; the glue-filled fluorophor 5 is located between the LED lights and the glass 1; and the glue-filled fluorophor 5 comprises a body 51 and an extension portion 52, wherein the body 51 is flush with the LED lights, the extension portion 52 is located above the body 51 and higher than the LED lights, that is to say, the body 51 is located on the same layer as the LED lights, and the extension portion 52 is located on a layer above the LED lights, i.e., on a layer closer to the glass 1, and a light-emitting area is formed on each of an outer surface of the body 51 and an outer surface of the extension portion 52. The rearview mirror having a display instrument function provided by the present disclosure has a relatively large display area, and the LED light-emitting area of the rearview mirror having a display instrument function provided by the present disclosure is closer to the edge, thereby allowing the rearview mirror to retain as much mirror area as possible.

In an optional solution of the present embodiment, preferably, referring specifically to FIG. 8, the edge of the glass 1 protrudes from the front shell 3, an interior of the glass 1 is provided with an arc-shaped inner surface, and a reflected light channel is formed on one side of the glass facing the front of the vehicle; and light rays directed from the extension portion 52 to the arc-shaped inner surface are reflected on the arc-shaped inner surface, and the reflected light rays emerge through the reflected light channel, thereby forming a light-emitting narrow edge 14 in front of the vehicle. As to the light-emitting narrow edge 14, reference can be made to FIG. 9 (viewing from the front of the vehicle to the rear of the vehicle), in which the light-emitting narrow edge 14 is formed by a portion of the edge of the glass 1 protruding from the front shell 3. Due to the above-described special design of this embodiment, the light-emitting narrow edge 14 can be seen by a viewer from the front of the vehicle, which not only can achieve an aesthetic effect, but also can make the rearview mirror more conspicuous.

In an optional solution of the present embodiment, preferably, the rearview mirror comprises a plurality of glue-filled fluorophors 5, wherein the plurality of glue-filled fluorophors 5 are distributed at the edge of the glass 1 and the plurality of glue-filled fluorophors 5 at least form an LED display area for rpm and an LED display area for vehicle speed;

the LED display area for rpm and the LED display area for vehicle speed are each provided with digital LED lights and a dashed-line LED lights; and the digital LED lights are configured to display an integer value, and the dashed-line LED lights are configured to display a non-integer value.

More specifically, referring to FIG. 3, FIG. 3 is a front view of the rearview mirror having a display instrument function provided by the present embodiment, wherein X1-X1 corresponds to LED lights for non-integer values; and X2-X2 corresponds to a section of LED lights for integer values; referring further to FIG. 4 and FIG. 5, FIG. 4 is a sectional view taken along X2-X2, and FIG. 5 is a partially enlarged view of I in FIG. 4, wherein LED lights at the rear of the glue-filled fluorophor 5 in FIG. 5 are relatively long, which substantially cover the entire area of the glue-filled fluorophor 5, and are configured to correspondingly display integer indications. Referring further to FIG. 6 and FIG. 7, FIG. 6 is a sectional view taken along X1-X1, and FIG. 7 is a partially enlarged view of F in FIG. 6, wherein LED lights at the rear of the glue-filled fluorophor 5 in FIG. 7 are relatively short, which covers only the upper area of the fluorophor of wide-angle, and are configured to correspondingly display non-integer values.

In an optional solution of the present embodiment, preferably, referring to FIG. 2, the rearview mirror further comprises a front shell 3, wherein the front shell 3 and the glass 1 are bonded to one another by a double-sided tape 2, and the front shell 3 and the double-sided tape 2 are each provided thereon with openings for keeping away from the glue-filled fluorophor 5, a touch key, a nixie tube 005 and a screen 7.

In an optional solution of the present embodiment, preferably, referring to FIG. 2, the rearview mirror further comprises a PET transparent film 4, wherein the PET transparent film 4 is disposed on one side of the front shell 3 facing away from the glass 1 and the PET transparent film 4 is provided thereon with openings for keeping away from the glue-filled fluorophor 5, a touch key, a nixie tube 005 and a screen 7.

In an optional solution of the present embodiment, preferably, referring to FIG. 2, the rearview mirror further comprises a PCB board 6 for LED light, wherein the PCB board 6 for LED light is provided thereon with LED lights, a touch key board and a nixie tube, and the PCB board 6 for LED light is further provided thereon with an opening for keeping away from a screen 7.

In an optional solution of the present embodiment, preferably, referring to FIG. 2, the rearview mirror further comprises a screen 7, wherein the screen 7 is attached to one side of the PCB board 6 for LED light facing away from the glass 1 and covers an opening of the PCB board 6 for LED light for keeping away from the screen 7.

In an optional solution of the present embodiment, preferably, referring to FIG. 2, the rearview mirror further comprises a screen PCB 8, wherein the screen PCB 8 is arranged behind the screen 7.

In an optional solution of the present embodiment, preferably, referring to FIG. 2, the rearview mirror further comprises a rear shell assembly, wherein the rear shell assembly comprises a rear shell body 12, a loudspeaker 10 mounted on one side of the rear shell body 12 facing the glass 1, a grip ball socket 11 which is mounted on the side of the rear shell body 12 facing the glass 1 passes through the rear shell body 12, and a bracket 13 which is disposed on one side of the rear shell body 12 facing away from the glass 1 and is connected with the grip ball socket 11.

In an optional solution of the present embodiment, preferably, referring to FIG. 2, the rear shell assembly further comprises a rubber column 9, wherein the rubber column is inserted in a corresponding stand column of the rear shell body for use of connection and support.

In an optional solution of the present embodiment, preferably, referring to FIG. 2, the glass 1 is provided thereon with a light transmissive area of photoresistor, wherein the light transmissive area of photoresistor is configured to adjust brightness of a screen and reflectivity of the glass 1 according to brightness of collected light rays.

In connection with the solutions described above, a plurality of areas are formed on a working surface (the surface facing the rear of the vehicle) of the rearview mirror having a display instrument function provided in this embodiment, for the details thereof, references may be made to FIG. 10, wherein A is an LED display area for rpm, located at the left-side edge of the rearview mirror and configured to display the rpm by the LED light 004;

B is an LED display area for vehicle speed, located at the right-side edge of the rearview mirror and configured to display the vehicle speed by the LED light 004;

C is a nixie tube display area for rpm, configured to display the numerical value of the rpm by the nixie tube 005;

D is a screen display area, the screen 7 is configured to directly display a preset program or graphic;

E is a light transmissive area of photoresistor, configured to adjust the brightness of the screen and the reflectivity of the glass 1 according to the brightness of collected light rays;

F is a display area for extended function, which is used for later-stage function expansion;

G is a nixie tube display area for vehicle speed, configured to display the numerical value of the vehicle speed by the nixie tube 005; and H is a display area for TP key, wherein a user instruction is input by operation of the TP key 003.

Embodiment 2

The present embodiment provides a control system of a rearview mirror having a display instrument function, referring to FIG. 11, comprising an OBD 001, an MCU 002 and LED lights;

wherein the OBD 001 is configured to acquire information on rpm and vehicle speed, and transmit the information on rpm and vehicle speed to the MCU 002;

the MCU 002 is in signal connection with the OBD 001, and is configured to receive the information on rpm and vehicle speed, then generate control information according to the information on rpm and vehicle speed, and transmit the control information to a corresponding LED light; and the LED lights are in signal connection with the MCU 002, and are configured to light up upon receipt of the control information.

As described above, OBD (On-Board Diagnostic) is interpreted as on-board diagnostic system. This system monitors, at all times, operation conditions of the engine and working state of the exhaust gas after-treatment system.

As described above, MCU (Microcontroller Unit; MCU 002) is also referred to as single chip microcomputer or single chip.

In an optional solution of the present embodiment, preferably, the control system of a rearview mirror having a display instrument function further comprises a TP key 003, a nixie tube 005, an expansion port 006 and a sound module 007, referring to FIG. 11;

wherein the TP key 003 is used for inputting functional information to the MCU 002;

the nixie tube 005 is in signal connection with the MCU 002, and is configured to display the control information of the MCU 002 after receiving the control information;

the expansion port 006 is in signal connection with the MCU 002, and is configured to display information on oil consumption or temperature parameters; and the sound module 007 is in signal connection with the MCU 002, and is configured to output audio information.

In an optional solution of the present embodiment, preferably, the LED lights at the edge are configured to sequentially light up (go out) as the speed increases (decreases), producing a dynamic effect. Meanwhile, the sound module is so configured that the volume of the sound produced thereby increases (decreases) as the speed (rotation speed) increases (decreases).

Finally, it should be noted that the above embodiments are only used to illustrate the technical solutions of the present disclosure, rather than limit the same; although the present disclosure has been described in detail with reference to the foregoing embodiments, it should be understood by those of ordinary skills in the art that the technical solutions described in the embodiments can still be modified, or equivalent substitution can be made to some or all of the technical features therein; and the modification or substitution would not cause the substance of the corresponding technical solutions to get out of the scope of the technical solutions of the embodiments of the present disclosure.

Industrial applicability: the rearview mirror having a display instrument function provided by embodiments of the present disclosure has a relatively large display area, and the LED light-emitting area of the rearview mirror having a display instrument function provided by an embodiment of the present disclosure is closer to the edge, thereby allowing the rearview mirror to retain as much mirror area as possible.

The invention claimed is:

1. A rearview mirror having a display instrument function, comprising
    LED lights, a glue-filled fluorophor and glass,
    wherein the glue-filled fluorophor is located between the LED lights and the glass, and light rays emitted from the LED lights pass through the glue-filled fluorophor and are directed towards the glass; and
    the glue-filled fluorophor comprises a body and an extension portion, the body is flush with the LED lights, the extension portion is located above the body and higher than the LED lights, and a light-emitting area is formed on each of an outer surface of the body and an outer surface of the extension portion.

2. The rearview mirror having a display instrument function according to claim 1,
    wherein an edge of the glass protrudes from a front shell, an interior of the glass is provided with an arc-shaped inner surface, and a reflected light channel is formed on one side of the glass facing front of the vehicle; and
    light rays directed from the extension portion to the arc-shaped inner surface are reflected on the arc-shaped inner surface, and the reflected light rays emerge through the reflected light channel, thereby forming a light-emitting narrow edge in front of the vehicle.

3. The rearview mirror having a display instrument function according to claim 1,
    wherein the rearview mirror comprises a plurality of glue-filled fluorophors, the plurality of glue-filled fluorophors are distributed at the edge of the glass and the plurality of glue-filled fluorophors at least form an LED display area for rpm and an LED display area for vehicle speed.

4. The rearview mirror having a display instrument function according to claim 3,
    wherein the LED display area for rpm and the LED display area for vehicle speed are each provided with digital LED lights and dashed-line LED lights; and
    the digital LED lights are configured to display an integer value, and the dashed-line LED lights are configured to display a non-integer value.

5. The rearview mirror having a display instrument function according to claim 1,
    wherein the rearview mirror further comprises a front shell, the front shell and the glass are bonded to one another by a double-sided tape, and the front shell and the double-sided tape are each provided thereon with openings for keeping away from the glue-filled fluorophor, a touch key, a nixie tube and a screen.

6. The rearview mirror having a display instrument function according to claim 5,
    wherein the rearview mirror further comprises a PET transparent film disposed on one side of the front shell facing away from the glass and the PET transparent film is provided thereon with openings for keeping away from the glue-filled fluorophor, the touch key, the nixie tube and the screen.

7. The rearview mirror having a display instrument function according to claim 1,
    wherein the rearview mirror further comprises a PCB board for LED light, the PCB board for LED light is provided thereon with the LED lights, a touch key board and a nixie tube, and the PCB board for LED light is further provided with an opening for keeping away from a screen.

8. The rearview mirror having a display instrument function according to claim 7,
    wherein the rearview mirror further comprises the screen, the screen is attached to one side of the PCB board for LED light facing away from the glass and covers the opening for keeping away from the screen, with the opening provided on the PCB board for LED light.

9. The rearview mirror having a display instrument function according to claim 1,
    wherein the rearview mirror further comprises a rear shell assembly, the rear shell assembly comprises a rear shell body, a loudspeaker mounted on one side of the rear shell body facing the glass, a grip ball socket which is mounted on the side of the rear shell body facing the glass and passes through the rear shell body, and a bracket which is disposed on one side of the rear shell body facing away from the glass and is connected with the grip ball socket.

10. The rearview mirror having a display instrument function according to claim 9,
   wherein the rear shell assembly further comprises a rubber column, the rubber column is inserted in a corresponding stand column of the rear shell body for use of connection and support.

11. The rearview mirror having a display instrument function according to claim 1,
   wherein the glass is provided thereon with a light transmissive area of photoresistor, the light transmissive area of photoresistor is configured to adjust brightness of a screen and reflectivity of the glass according to brightness of collected light rays.

12. A control system of a rearview mirror having a display instrument function, comprising an On-Board Diagnostic (OBD), a Microcontroller Unit (MCU) and LED lights,
   wherein the OBD is configured to acquire information on rpm and vehicle speed, and transmit the information on rpm and vehicle speed to the MCU;
   the MCU is in signal connection with the OBD, and is configured to receive the information on rpm and vehicle speed, then generate control information according to the information on rpm and vehicle speed, and transmit the control information to a corresponding LED light; and
   the LED lights are in signal connection with the MCU, and are configured to light up upon receipt of the control information.

13. The control system according to claim 12, further comprising a TP key, a nixie tube, an expansion port and a sound module,
   wherein the TP key is used for inputting functional information to the MCU;
   the nixie tube is in signal connection with the MCU, and is configured to display the control information of the MCU after receiving the control information;
   the expansion port is in signal connection with the MCU, and is configured to display information on oil consumption or temperature parameters; and
   the sound module is in signal connection with the MCU, and is configured to output audio information.

14. The control system according to claim 12, wherein the LED lights are configured to sequentially light up as the vehicle speed increases, and the LED lights are configured to sequentially go out as the vehicle speed decreases, producing a dynamic effect.

15. The control system according to claim 12, wherein the sound module is such configured that volume of the sound produced by the sound module increases as the vehicle speed increases, and the sound module is such configured that the volume of the sound produced by the sound module decreases as the vehicle speed decreases.

* * * * *